United States Patent [19]

Riddle

[11] Patent Number: 5,434,860
[45] Date of Patent: Jul. 18, 1995

[54] FLOW CONTROL FOR REAL-TIME DATA STREAMS

[75] Inventor: Guy G. Riddle, Los Gatos, Calif.

[73] Assignee: Apple Computer, Inc., Cupertino, Calif.

[21] Appl. No.: 230,371

[22] Filed: Apr. 20, 1994

[51] Int. Cl.$^6$ ................................................ H04J 3/22
[52] U.S. Cl. ........................................ 370/84; 370/60; 370/94.1
[58] Field of Search ................. 370/94.1, 60, 94.2, 370/60.1, 13, 17, 94.3, 58.1, 58.3, 84

[56] References Cited

U.S. PATENT DOCUMENTS

| | | | |
|---|---|---|---|
| 4,691,314 | 9/1987 | Bergins et al. | 370/94.1 |
| 5,307,351 | 4/1994 | Webster | 370/94.1 |
| 5,313,454 | 5/1994 | Bustini et al. | 370/13 |
| 5,313,455 | 5/1994 | Van der Wal et al. | 370/13 |

*Primary Examiner*—Douglas W. Olms
*Assistant Examiner*—Ajit Patel
*Attorney, Agent, or Firm*—Burns, Doane, Swecker & Mathis

[57] ABSTRACT

The present invention, generally speaking, provides for transmission and flow control of real-time data streams over computer networks. A real-time data stream is transmitted in data packets from a data source in accordance with a predetermined protocol over a shared network, for example. Data packets of said real-time data stream are received at a data destination connected to the local area network. The data destination determines a suggested data rate for the data source based in part on a number of data packets lost during a preceding interval of time and transmits the suggested data rate to the data source. The suggested data rate is received at the data source, which adjusts its data rate of the in accordance with the suggested data rate. The rate adjustment mechanism is designed such that a network segment will not be overloaded with a single isochronous data stream connection and that a disproportionate shared of the network bandwidth is not consumed by the isochronous data stream connection.

22 Claims, 3 Drawing Sheets

FLOW CONTROL FOR REAL-TIME DATA STREAMS

BACKGROUND OF THE INVENTION

1. Field of the Invention

The present invention relates to flow control, i.e., regulation of traffic allowed on a portion of a communications network to avoid excessive congestion.

2. State of the Art

One of the characteristic of a real-time data stream, such as a videophone data stream, is that it is isochronous—that time is of the essence. If an error occurs in a video or audio stream, the system cannot afford the time to stop everything and retransmit the lost data packets—this will seriously upset the real-time data flow. A better procedure is to just "plow ahead" and pick up the video (or audio) with the next intact frame received.

A similar situation exists with respect to flow control. Known methods of flow control for non-real-time data streams include "stop and wait" flow control and "sliding window" flow control. In stop and wait flow control, a response to data previously sent must be received before any more data may be sent. Stop and wait flow control therefore assumes that the data flow may be interrupted and resumed at will—clearly not the case with real-time data.

In sliding window flow control, flow credits are exchanged and used up. For example, the receiver might allocate a receive buffer of 1000 bytes and send a "send credit" value of 1000 to the sending side. If the sender then sends 100 bytes to the receiver, it keeps track by setting a "sent" variable to 100. At this point the transmitter could send 1000−100=900 more bytes. As the receiver processes the data and frees up buffer space, it might bump the send credit value to 1000+100=1100 and send this value to the sending side. The sender would now be allowed to send "send credit" minus "sent" bytes to the receiver, namely 100−100=1000. As with stop and wait flow control, sliding window flow control assumes that the data flow may be interrupted and resumed at will. Neither these nor other known methods of flow control arc suitable for real-time data streams.

A variety of other approaches to flow control have been proposed, some of which have been implemented. One such technique is packet discarding—simply discarding excess packets. Another technique, known as isarithmic flow control, limits the total number of packets in the network by using permits that circulate within the network. Whenever a node wants to send a packet, it must first capture a permit and destroy it. The permit is regenerated when the destination node removes the packet from the network. In another approach, which may be referred to as the choke packet approach, nodes detecting congestion send "choke packets" back to the source of any message sent into the congested region. The source is then required to reduce or eliminate this type of traffic. Various flow control techniques are described in Grange, J. L., and Glen, M., eds. *Flow Control in Computer Networks*. Amsterdam: North Holland Publishing, 1979.

None of the foregoing flow control mechanisms are optimized for flow control of real-time data streams.

SUMMARY OF THE INVENTION

The present invention, generally speaking, provides for flow control of real-time data streams over computer networks. A real-time data stream is transmitted in data packets from a data source in accordance with a predetermined protocol over a shared network, for example. Data packets of the real-time data stream are received at a data destination connected to the shared network. The data destination determines a suggested data rate for the data source based in part on a number of data packets lost during a preceding interval of time and transmits the suggested data rate to the data source. The suggested data rate is received at the data source, which adjusts its data rate in accordance with the suggested data rate. The rate adjustment mechanism is designed such that a network segment will not be overloaded with a single isochronous data stream connection and that a disproportionate shared of the network bandwidth is not consumed by the isochronous data stream connection.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
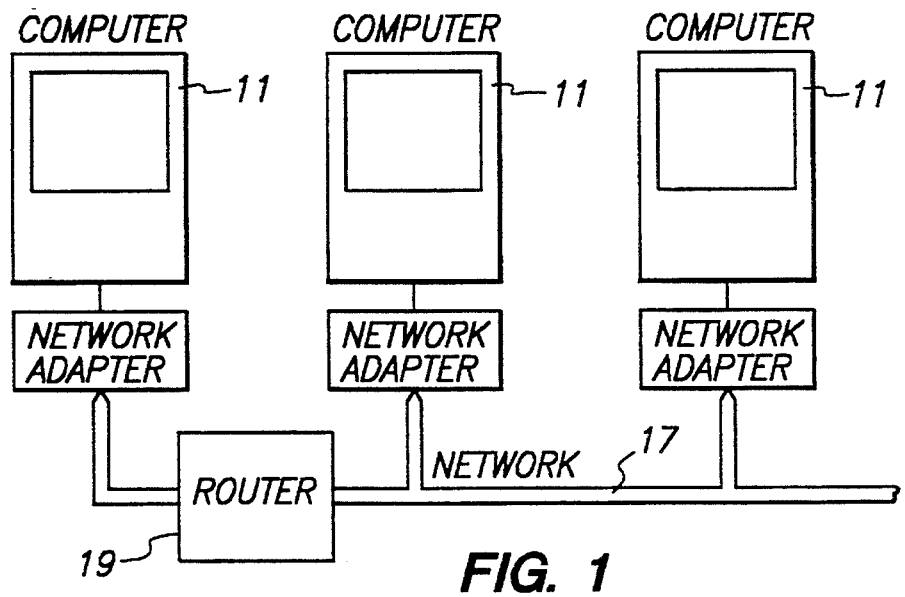
FIG. 1 is a system diagram of computers coupled for exchanging real-time data streams to which the present method of flow control is applicable.

Referring to FIG. 1, the present method of flow control is applicable to shared computer networks in which multiple computers 11 exchange real-time data, such as videophone data, across a network 17 including one or more routers such as a router 19. Videophone and other real-time traffic will generate large amounts of data occupying large bandwidths. To prevent videophone users from interfering with other network users, there is provided an automatic means of limiting the data generated (flow control) whenever reduced network performance is detected. In a system composed of multiple network segments connected by rout-limiting factors on network throughput is the processing capacities of the routers themselves: when they are overloaded, they will begin to drop packets. In the following method of flow control, an increase in lost packets is therefore attributed to an overload condition somewhere along the path the videophone packets are travelling. (An increase in lost packets could, of course, be due to a poor quality transmission line along the path—but the receiving node has no way of determining whether such a condition does or does not exist.)

The approach followed by the present method of flow control is to measure the number of packets received from the remote videophone application and the number of packets lost during transmission. As described more fully in U.S. application Ser. No. 08/129,992, filed Sep. 30, 1993, incorporated herein by reference, each packet carries a sequence number whereby the number of packets lost can be readily determined. Based on this information, the receiving node periodically computes a proposed packet transmission rate that will not overload the network. This rate is then sent back to the transmitter (on a reliable control channel, described in the aforementioned copending application), which uses it to adjust parameters under its control to limit its generated bandwidth. These parameters may include the frame rate and compression ratios. If there are multiple streams between the transmitter and receiver, the receiver computes a data rate for each incoming stream but then add the rates for the individual streams and sends the transmitter only the sum for the call. The transmitter is free to reallocate the bandwidth among the various streams of the call as long as the total goal is achieved.

Measurements are made every interval of $T_{goal}$ ticks (one tick is 1/60 second). For each stream, the number of packets received P, the number of bytes received N (the total of the lengths of the received packets), and the number of packets lost L (determined by counting missing sequence numbers in the stream) during that interval are all recorded.

Computing L, the number of lost packets, is complicated by the possibility of packets arriving out of order. The following process L accounts for that possibility:

For each stream keep a variable
E = next expected sequence number.
1. If the packet sequence number M = = E, set
E = E + 1
P = P + 1
N = N + (size of packet)
2. If M > E, set
L = L + (M − E)
P = P + 1
N = N + (size of packet)
E = (M + 1)
3. If M < E, set
L = L − 1
P = P + 1
N = N + (size of packet)

The foregoing comparisons may be simplified using modulo arithmetic. For example, if M is in ¼ of the sequence number space greater than E using modulo arithmetic, then M > E is judged to be true.

If the measurement shows P to be zero during the interval, the stream is simply reported to be idle, and none of the following computations are performed.

At the end of each interval of $T_{actual}$ ticks (the actual elapsed time since the last measurement), the received data rate $R_{measured}$ (in bytes/second) is computed as follows:

$$R_{measured} = (N/T_{actual}) * (60 \text{ ticks/second}).$$

The ErrorRate (also in bytes/second) is calculated as:

$$ErrorRate = (L * Rmeasured)/P.$$

In addition, a variable ErrorFree is calculated in accordance with the following procedure:

if(L == 0)
    ErrorFree++;
else if(L > 1)
    ErrorFree = 0;
else if(ErrorFree > 0)
    ErrorFree−−;

The value of ErrorFree indicates the number of consecutive intervals that the stream has been error-free. A special case is provided for when a single error is noted during the interval in order to not penalize the flow where there appear to be lost packets but the packets are instead merely out-of-sequence.

To prevent short-term fluctuations in network traffic from causing wild perturbations in data flows, the computed received data rates over the last B intervals are tracked (in a vector r[1..B]), and averaging is used to smooth out the fluctuations. Rather than giving all the intervals equal weight, most weight is given to the most recent interval (which is r[B], r[1] being the oldest kept). The weights (which, in a preferred embodiment, must total 100) are kept in a vector Weights [1..B].

Next the weighted data rate $R_{weighted}$ over the last B intervals is computed as follows:

for(i = 1..B−1)
    $r_i = r_{i+1}$
$r_B = R_{measured}$
$R_{weighted} = (\Sigma_{(i=1..B)} (W_i * r_i))/100$ The manner in which $R_{weighted}$ is computed is illustrated in FIG. 2A through FIG. 2D. The data rates over each of a number intervals are stored in "buckets", each of which has associated with it a weight. In a preferred embodiment, there are four buckets with which the weights 10, 20, 30, and 40 are associated, respectively. The buckets are ordered in a queue such that the data rate over the most recent interval is stored in the bucket having a weight of 40, the data rate over the next-most-recent interval is stored in the bucket having a weight of 30, etc.

Figure 2A:
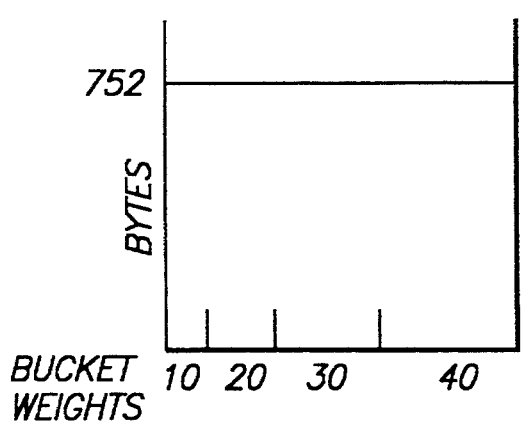
FIG. 2A through FIG. 2D are diagrams illustrating how a weighted average data rate is determined.
Figure 2B:
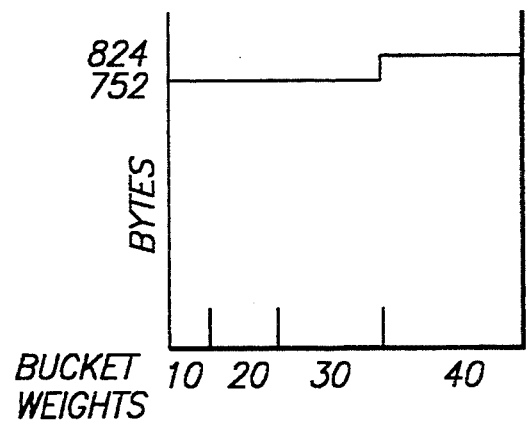
Figure 2C:
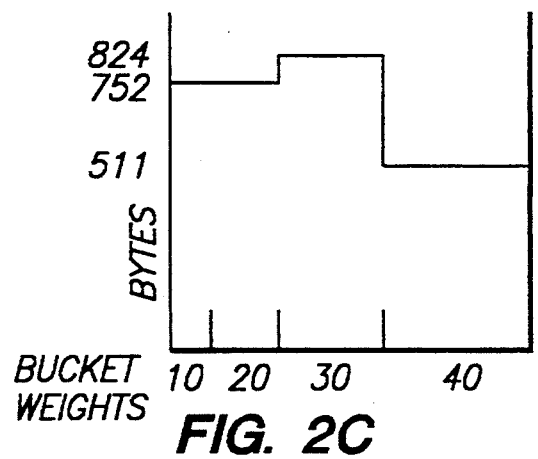
Figure 2D:
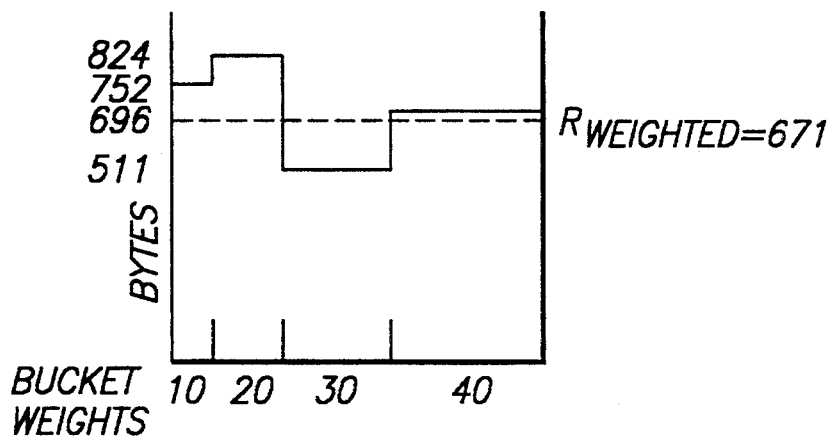

Referring particularly to FIG. 2A, after the data rate during a first interval has been measured, all of the buckets ate initialized to this value, for example 752, meaning that 752 bytes were received during the interval. Assume that 824 bytes are received during the next interval. At the end of the next interval, the value 824 replace the value 752 in the last bucket as shown in FIG. 2B. Assume now that 511 bytes are received during the next interval and that 696 bytes are received during the next interval after that. These values are stored in the buckets at the conclusion of the respective intervals as illustrated in FIG. 2C and FIG. 2D. At the conclusion of the fourth interval, the weighted average is 671 bytes, represented by a straight line having an area underneath equal to the area under the line segments representing the "levels" of the respective buckets.

Once $R_{weighted}$ has been computed, a suggested data rate $R_{suggested}$ to be used by the remote transmitter may then be computed. However, in order to dampen wild fluctuations that may occur when operating under some operating systems, a variable Cap is used to limit the maximum change in $R_{suggested}$ based upon the previous value of $R_{suggested}$ as follows:

$$Cap = R_{suggested} * 25\%.$$

If the flow is experiencing a good run of error-free intervals, the suggested data rate is boosted, as a reward, by a value that increases for each consecutive error-free interval, but not by more than a certain percentage (ErrorFreeCap) of a maximum allowed rate MaxRate. Conversely, when errors are encountered, the suggested data rate is penalized by more, by a factor ErrorRateFactor, than the measured ErrorRate as follows:

if(ErrorFree > 0)
 $R_{suggested} = R_{weighted} +$
  min((MaxRate * min(ErrorFree, ErrorFreeCap))/100, Cap)
else
 $R_{suggested} = R_{weighted} -$
  min((ErrorRate * ErrorRateFactor), Cap)

Figure 3A:
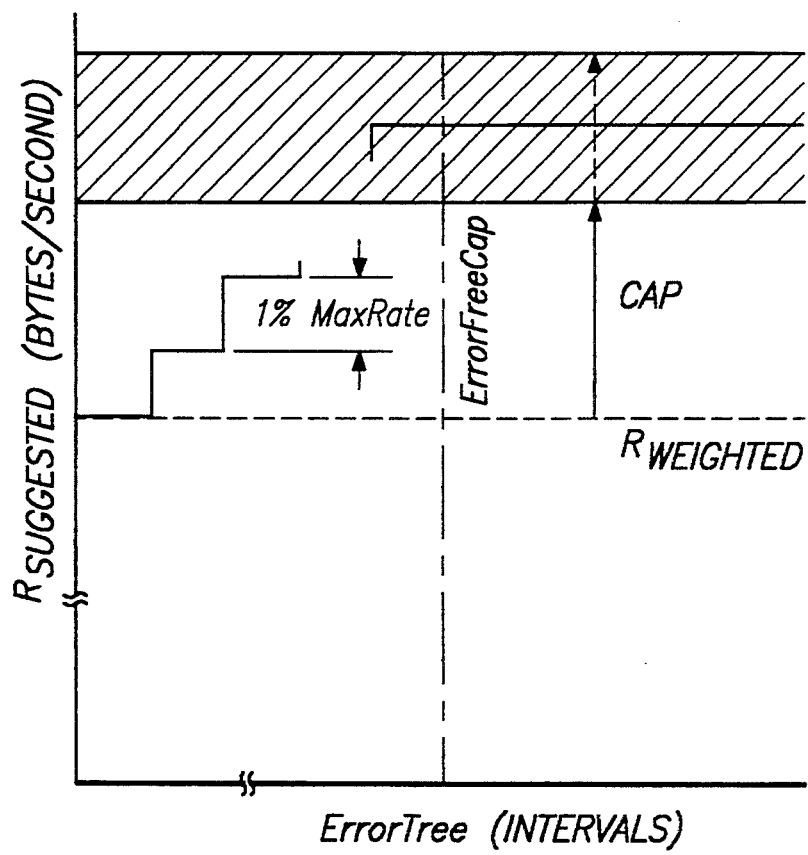
FIG. 3A is a graph illustrating how the weighted average data rate is adjusted upward during an error-free run to arrive at a suggested data rate.
Figure 3B:
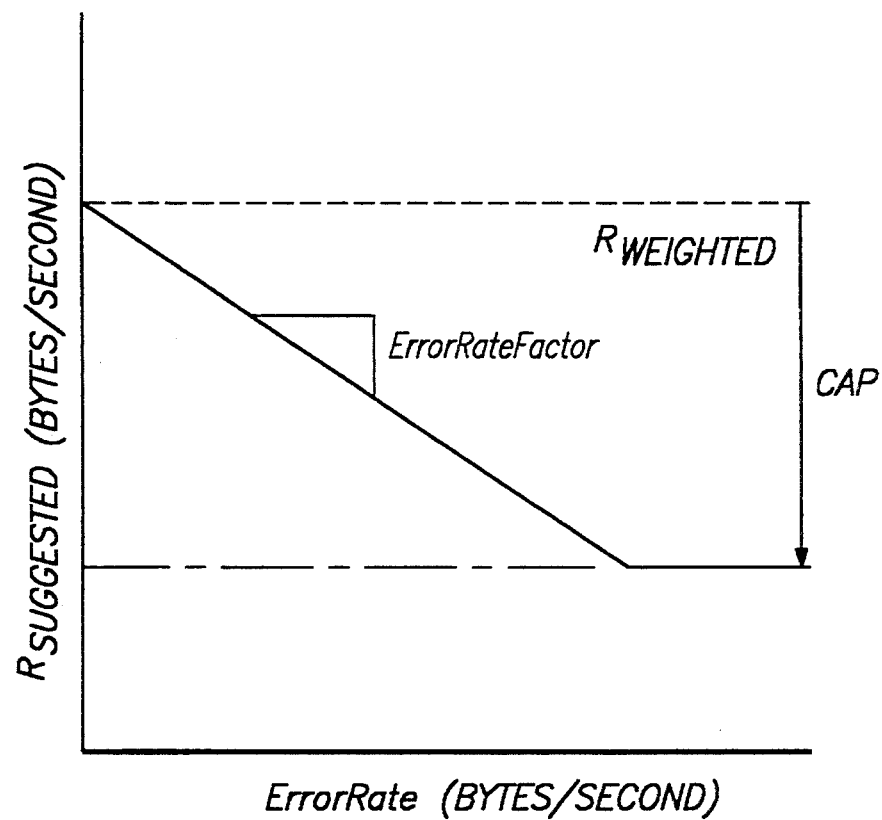
FIG. 3B is a graph illustrating how the weighted average data rate is adjusted downward during an error-prone run to arrive at a suggested data rate.

The manner in which $R_{weighted}$ is adjusted to arrive at $R_{suggested}$ is illustrated in FIG. 3A and FIG. 3B.

Referring particularly to FIG. 3A, the weighted average data rate is adjusted upward during an error-free run to arrive at a suggested data rate. In a preferred embodiment, for each consecutive error-free interval up to the maximum ErrorFreeCap, the weighted average data rate $R_{weighted}$ is increased by one percent of the maximum allowed rate MaxRate. This increase is subject in addition to the limit Cap, which in a preferred embodiment is based on the previous value of $R_{suggested}$ and be greater than or less than the cap computed using ErrorFreeCap.

Referring to FIG. 3B, the weighted average data rate is adjusted downward during an error-prone run to arrive at a suggested data rate. The weighted average data rate is decreased by an amount that increases linearly with ErrorRate. The constant ErrorRateFactor is the slope of the line representing $R_{suggested}$ and is the proportionality constant between $R_{suggested}$ and ErrorRate. The decrease in the weighted average data rate is subject to the same cap as in FIG. 3A.

Finally, after computing the $R_{suggested}$ values for all streams on the call, they are added together and the total sent to the transmitter over the reliable control channel. The transmitter then is required to adjust its data generation rate accordingly.

In a preferred embodiment measurement intervals are not synchronized with the flow. When starting up from the idle state, the data from the first measurement interval is therefore indubitably wrong, inasmuch as the measurement does not cover the complete interval. The data from the first measurement interval is therefore discarded. The computations begin instead using the second interval data by initializing ErrorFree to zero, $R_{suggested}$ to MaxRate, and filling all values of the vector r with the first computed $R_{measured}$ before computing the first $R_{weighted}$.

If the transmitter starts off transmitting immediately at MaxRate, it is quite possible to overload particularly slow routers with so much traffic that even the first value of $R_{suggested}$ cannot be returned from the far end returned reliably. To avoid this possibility, transmitters are required to start transmitting on a newly minted stream at a lower rate InitialRate. As experience is accumulated, this rate is adjusted up or down.

In an exemplary embodiment, the following values of the foregoing global constants were used:
 $T_{goal}$=(5 seconds) * (60 ticks/second)=300 ticks
 B=4 buckets
 Weights={10, 20, 30, 40}
 MaxRate=((6,000,000 bps)/2)/(8 bits/byte)=375,000 bytes/second
 InitalRate=MaxRate * 25%
 ErrorFreeCap=7
 ErrorRateFactor=10

In addition, the following variables are kept per active stream:
 r[1..B]=rate history
 ErrorFree=count of error-free intervals
 $R_{suggested}$=data rate the remote transmitter should use One characteristic of the described method of flow control is that once a transmitter has succeeded in obtaining bandwidth, it will tend to keep that bandwidth in preference to later attempts by other transmitters to obtain bandwidth. So, for example, if one end of a call is put on hold temporarily, the other end will gradually absorb and attempt to keep the vacated bandwidth, making it hard for the one end to regain bandwidth when taken off hold.

One solution to this problem is rate averaging, which may be performed by the transmitter when it detects the rate it is allowed to transmit, the $R_{suggested}$ just received, is larger than the suggested rate the transmitter is sending to the other side. Since the data flowing in both directions is likely to be travelling the same path, the transmitter and the receiver are both benefitted by cooperating to allocate the channel bandwidth. When the foregoing condition is detected, the transmitter therefore voluntarily lower its transmission rate to halfway between the two $R_{suggested}$ values to approach a more equitable distribution.

This rate averaging method also compensates for possible disparities in the capabilities of the two machines involved in the transmission, one of which may be capable of seizing a disproportionate amount of the bandwidth.

Figure 4:
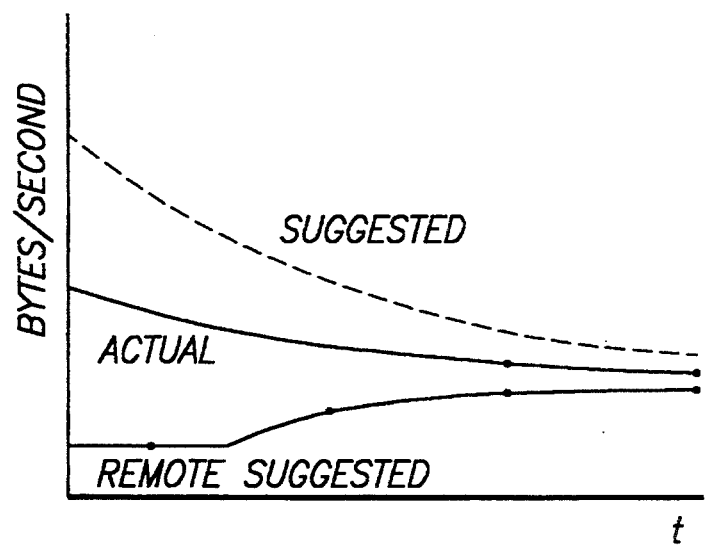
FIG. 4 is a graph illustrating the operation of rate averaging.

The manner in which rate averaging achieves a more equitable bandwidth distribution is illustrated in FIG. 4. As the "dominant" station voluntarily reduces its transmission rate, the opposite station reduces the suggested data rate that it sends to the dominant station. At the same time, the "subservient" station is able to seize more bandwidth as the dominant station vacates bandwidth. The suggested and actual data rates of the two stations therefore tend to converge.

The maximum data rate as described above is set in an attempt to not overload an Ethernet segment with a single videophone or other real-time data call.

The foregoing has described the principles, preferred embodiments, and modes of operation of the present invention. However, the invention should not be limited to the embodiments discussed. The above-described embodiments should therefore be regarded as illustrative rather than restrictive. Variations in those embodiments may be made without departing from the scope of the present invention as defined by the following claims. For example, the measurement interval length may be adjusted. Lowering the measurement interval length will cause the flow control process respond more quickly to network changes. The number of buckets used may be increased or decreased to keep a longer or shorter history of network traffic. The weights used may be changed, for example to make them less exponential. Furthermore, rather than calculating the suggested data rate at the receiver, the receiver may simply send raw measurements to the transmitter from which the transmitter may then calculated the suggested data rate. Other variations will be apparent to one of ordinary skill in the art.

What is claimed is:

1. A method of regulating transmission over a shared computer network of a data stream captured from a real time data signal and transmitted as capture is proceeding, comprising the steps of:

transmitting in data packets in accordance with a predetermined protocol said data stream from a data source over the shared computer network;

receiving data packets of said data stream at a data destination connected to said shared network;

using information contained in an information field within each of said data packets, determining a number of lost data packets transmitted by the data source but not received by the data destination during a preceding interval of time;

determining a suggested data rate for the data source based in part on said number of lost data packets; and transmitting from the data destination to the data source information related to the suggested data rate.

2. The method of claim 1, wherein the suggested data rate is determined at the data destination and transmitted from the data destination to the data source.

3. The method of claim 2, comprising the further steps of receiving the suggested data rate at the data source; and adjusting a data rate of the data source in accordance with the suggested data rate.

4. The method of claim 3, wherein the suggested data rate is transmitted across a reliable control channel.

5. The method of claim 1, wherein the suggested data rate is determined at the data source using the information transmitted from the data destination to the data source.

6. The method of claim 5, comprising the further step of:

adjusting a data rate of the data source in accordance with the suggested data rate.

7. The method of claim 1, wherein the determining step comprises:

measuring a data rate of the data stream during respective ones of a plurality of substantially equal preceding intervals of time.

8. The method of claim 7, wherein the determining step further comprises:

forming an average of the data rate of the data stream during a plurality of intervals.

9. The method of claim 8, wherein the average is a weighted average of the data rate of the data stream during a plurality of intervals.

10. The method of claim 9, wherein the average is a weighted average of the data rate of the data stream during each of a predetermined number of consecutive preceding intervals.

11. The method of claim 8, wherein the suggested data rate is determined by adjusting the average data rate of the data stream during a plurality of intervals in accordance with the number of lost data packets transmitted by the data source but not received by the data destination during a preceding interval of time.

12. The method of claim 11, wherein the suggested data rate is determined by adding an increment to the average data rate when the number of lost packets during a preceding interval of time was low.

13. The method of claim 12, wherein an increment is added to the average data rate when the number of lost packets during an immediately preceding interval of time was zero.

14. The method of claim 13, wherein said increment is increased as a number of preceding intervals in which the number of packets lost was zero increases.

15. The method of claim 14, wherein the preceding intervals in which the number of packets lost was zero are consecutive intervals.

16. The method of claim 14, wherein the size of increment added to the average data rate is subject to an upper limit.

17. The method of claim 11, wherein an increment is subtracted from the average data rate when the number of lost packets during an immediately preceding time interval was non-zero.

18. The method of claim 17, wherein said increment is increased as a proportion of packets lost to packets received increases.

19. The method of claim 18, wherein the size of the increment subtracted from the average data rate is subject to an upper limit.

20. The method of claim 11, wherein, at start-up, the data stream is transmitted at an initial data rate lower than a maximum allowed data rate.

21. The method of claim 11, wherein, at the conclusion of a first interval following start-up, a proportion of packets lost to packets received during the first interval is ignored when determining the suggested data rate at the conclusion of the second and subsequent intervals.

22. A method of regulating transmission over a shared computer network of a plurality of data streams captured from respective real time data signals and transmitted as capture is proceeding, comprising the steps of:

transmitting in data packets in accordance with a predetermined protocol said plurality of data streams from a data source over the shared computer network;

receiving data packets of said plurality of data streams at a data destination connected to said shared network;

using information contained in an information field within each of said data packets, determining for each of said plurality of data streams a number of lost data packets transmitted by the data source but not received by the data destination during a preceding interval of time;

determining a suggested data rate for each of the plurality of data streams based in part on said number of lost data packets;

adding together suggested data rates for each of the plurality of real-time data streams to arrive at an aggregate suggested data rate;

transmitting from the data destination to the data source information related to the aggregate suggested data rate; and adjusting data rates of the plurality of data streams at the data source such that a combined data rate of the plurality of data streams does not exceed the aggregate suggested data rate.

* * * * *